United States Patent
Fujiwara et al.

(10) Patent No.: US 6,505,484 B1
(45) Date of Patent: Jan. 14, 2003

(54) FORMING METHOD OF SILICA GLASS AND FORMING APPARATUS THEREOF

(75) Inventors: Seishi Fujiwara, Sagamihara (JP); Norio Komine, Sagamihara (JP); Hiroki Jinbo, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/671,337

(22) Filed: Sep. 27, 2000

Related U.S. Application Data

(63) Continuation-in-part of application No. PCT/JP00/00469, filed on Jan. 28, 2000.

(30) Foreign Application Priority Data

Jan. 28, 1999 (JP) .............................. 11-020826

(51) Int. Cl.⁷ .............................................. C03B 11/00
(52) U.S. Cl. ............................ 65/66; 65/24; 65/374.13; 65/374.14; 65/374.15
(58) Field of Search ................... 65/24, 66, 374.13, 65/374.14, 374.15

(56) References Cited

U.S. PATENT DOCUMENTS

| | | | | |
|---|---|---|---|---|
| 3,414,464 A | * | 12/1968 | Long | .................. 65/374.15 |
| 3,863,325 A | * | 2/1975 | Gurganus et al. | .............. 65/24 |
| 4,358,306 A | * | 11/1982 | Okamoto et al. | |
| 4,678,495 A | | 7/1987 | Yoshizawa | |
| 4,936,893 A | * | 6/1990 | Yamada et al. | .......... 65/374.15 |
| 6,105,395 A | * | 8/2000 | Yoshida et al. | ................. 65/66 |

FOREIGN PATENT DOCUMENTS

| | | | | |
|---|---|---|---|---|
| JP | 56-129621 | | 10/1981 | |
| JP | 57-67031 | | 4/1982 | |
| JP | 57-92528 | | 6/1982 | |
| JP | 61-83638 | | 4/1986 | |
| JP | 2-51434 | * | 2/1990 | .............. 65/374.15 |
| JP | 2-74331 | | 6/1990 | |
| JP | 2-142440 | | 12/1990 | |
| JP | 4-54626 | | 2/1992 | |
| JP | 5-17174 | | 1/1993 | |
| JP | 8-107060 | | 4/1996 | |

* cited by examiner

Primary Examiner—Michael Colaianni
(74) Attorney, Agent, or Firm—Oliff & Berridge, PLC

(57) ABSTRACT

A silica glass forming method is a method of pressing a synthetic silica bulk having at least a set of opposed surfaces, on the surfaces under a high temperature condition by a presser, wherein an elastic member with permeability is placed between the presser and the surfaces of the synthetic silica bulk pressed by the presser and wherein the synthetic silica bulk is pressed through the elastic member by the presser. This method is able to reduce bubbles remaining inside the synthetic glass formed product after the forming to a sufficiently small amount. Therefore, it becomes feasible to provide the method that permits high-yield production of silica glasses with excellent optical characteristics.

8 Claims, 2 Drawing Sheets

FORMING METHOD OF SILICA GLASS AND FORMING APPARATUS THEREOF

RELATED APPLICATIONS

This is a Continuation-In-Part application of International Patent Application serial No. PCT/JP00/00469 filed on Jan. 28, 2000.

BACKGROUND OF THE INVENTION

1. Field of the Invention

The present invention relates to a method of forming silica glass into a desired shape by heating and pressing a synthetic silica bulk, and a forming apparatus thereof.

More particularly, the invention concerns a method of producing silica glass formed products with excellent optical characteristics, for example, suitable for optical members such as reticle (photomask) substrates, imaging optics, etc. in a high yield, by pressing synthetic silica bulks made of raw materials of silicon compounds such as silicon tetrachloride, silanes, organic silicons, and the like or synthetic silica bulks doped with a component to vary the index of refraction, such as Ge, Ti, B, F, Al, or the like, and a forming apparatus for carrying out the method.

2. Related Background Art

Reduction projection exposure systems (or photolithography systems) are mainly used for transfer of integrated circuit patterns such as ICs, LSIs, and so on. Requirements for projection optical systems used in the systems of this type are a wider exposure area with increase in integration of integrated circuits and higher resolving power throughout the entire exposure area. For enhancing the resolving power of the projection optical systems, it is conceivable to decrease the exposure wavelength to shorter wavelengths or to increase the numerical aperture (NA) of the projection optical systems.

The exposure wavelengths have been decreasing toward shorter wavelengths, e.g., from the g-line (436 nm) to the i-line (365 nm) and further to the KrF (248 nm) excimer laser and the ArF (193 nm) excimer laser. For further increase in integration of integrated circuits, research is now under way on methods for using a light source of the $F_2$ (157 nm) excimer laser, X-rays, or an electron beam. Among these, the reduction projection exposure apparatus using the $F_2$ excimer laser, which can be fabricated by taking advantage of the design concepts heretofore, is hastily moving into the limelight.

In general, in the case of optical glasses used as optical members of illumination optical systems or projection optical systems in the reduction projection exposure apparatus using the light sources of longer wavelengths than the i-line, the light transmittance decreases quickly in the wavelength region under the i-line and most optical glasses become untransmissive, particularly, to radiation in the wavelength region of not more than 250 nm. For that reason, silica glass, or single crystals of fluorides such as calcium fluoride, barium fluoride, and so on are usable as materials for lenses constituting the optical systems in the reduction projection exposure apparatus using the light source of excimer laser. These materials are essential materials to correction for chromatic aberration in the imaging optical system of excimer laser.

A reticle can be named as another significant element for printing circuits onto a wafer in the reduction projection exposure apparatus. The materials used for the reticle need to have transmission characteristics including endurance to the excimer lasers, of course, and another significant issue is thermal expansion due to heating of the substrate; therefore, the silica glass with good transmission characteristics and with a small coefficient of thermal expansion is used. Further important properties of the materials used for the reticle are chemical resistance and anti-etching characteristics thereof in view of the production processes.

A silica glass production method called a direct process is a method of mixing and burning a combustion gas (usually, oxygen gas) and a combustible gas (hydrogen gas or natural gas) in a silica glass burner, ejecting a silicon tetrachloride gas of high purity as a feed gas diluted with a carrier gas (oxygen gas, hydrogen gas, an inert gas, or the like), from the burner, making the feed gas react with water made by combustion of oxygen gas and hydrogen gas in the surroundings (to effect hydrolysis) to create silica glass particles, depositing the silica glass particles onto a target of a silica glass plate or the like undergoing rotation, swinging, and pulling-down motion, which is located below the burner, simultaneously melting the particles by heat of combustion of oxygen gas and hydrogen gas, and further vitrifying the deposits to obtain a silica glass ingot. This method permits the silica glass ingot to be obtained in relatively large diameter.

Another production method of silica glass ingot except for the direct process is a VAD (vapor-phase axial deposition) process making use of the technology used for production of optical fibers. This is a method of consolidating a porous silica glass preform by an atmospheric heat treatment.

The silica glass ingot fabricated by the production methods as described above is further cut into a glass block (synthetic silica bulk) having predetermined size and shape. Then this synthetic silica bulk is formed into a silica glass formed product of desired shape and size at high temperatures in a forming vessel of graphite and the formed product is used as an optical member such as the reticle or the like.

As one of such silica glass forming methods, Japanese Patent Application Laid-Open No. S56-129621 discloses the forming method of forming the bulk at the temperature of not less than 1700° C. and in a helium gas atmosphere under the absolute pressure of 0.1 to 760 Torr in the graphite forming vessel and thereafter quenching the formed product down to 1100 to 1300° C. Japanese Patent Application Laid-Open No. S57-67031 discloses the forming method in which the graphite forming vessel is of two or more-part split vertical structure. Further, Japanese Patent Publication of examined Application (KoKoku Publication) No. H04-54626 discloses the method of forming at 1600 to 1700° C. by use of the graphite forming vessel having the structure for relaxing stress caused by the difference between thermal expansion coefficients of the silica glass and the forming vessel.

SUMMARY OF THE INVENTION

The conventional forming methods described above, however, had the problem that bubbles were created in the synthetic silica bulk (silica glass) in the middle of pressing at high temperatures and a lot of bubbles remained in the silica glass formed product after the forming. This silica glass formed product with many bubbles remaining inside cannot be used as an optical member. Particularly, in the case of the synthetic silica bulks doped with the component to vary the refractive index, such as Ge, Ti, B, F, Al, or the like, because the viscosity thereof is high, a lot of bubbles tend to remain inside the silica glass formed product after the forming.

In general, in cases wherein the synthetic silica bulk (silica glass) is formed by pressing in the forming vessel, there occurs great difference in shrinkage between the synthetic silica bulk and the forming vessel during cooling down to the room temperature after the forming at high temperatures, because the constitutive materials of the silica glass bulk and the forming vessel have their respective coefficients of thermal expansion largely different from each other. For that reason, in the conventional methods, unwanted stress was exerted on the synthetic silica bulk and the forming vessel, so as to result in cracking of the silica glass formed product formed by pressing, or even breakage of the forming vessel in certain cases.

There also arises the problem that the constitutive materials of the synthetic silica bulk and the forming vessel react with each other at high temperatures. For example, where the graphite forming vessel is used as a forming vessel, the synthetic silica bulk reacts with graphite at high temperatures to create silicon carbide. Therefore, the surface of the silica glass formed product after the forming became rough, depending upon the forming temperatures, and cracking occurred from the rough surface in some cases.

An object of the present invention is, therefore, to provide a method of producing silica glass formed products with excellent optical characteristics free of the remaining bubbles and the cracking and suitable for the optical members such as the reticle substrates, the imaging optical systems, and so on in a high yield, by pressing the synthetic silica bulks made of the raw materials of silicon compounds such as silicon tetrachloride, silanes, organic silicons, and the like and the synthetic silica bulks doped with the component to vary the refractive index, such as Ge, Ti, B, F, Al, and so on; and a forming apparatus for carrying out the method.

The inventors have conducted intensive and extensive studies in order to achieve the above object and found out that the above problems could be solved by interposing an elastic member with such permeability as to absorb a pressure difference appearing between the synthetic silica bulk to be processed and the forming vessel, between the synthetic silica bulk and the forming vessel, thus accomplishing the present invention.

Namely, a forming method of silica glass according to the present invention is a silica glass forming method of pressing a synthetic silica bulk having at least a set of opposed surfaces, on the surfaces under a high temperature condition by pressing means, wherein an elastic member with permeability is placed between the pressing means and said surfaces of the synthetic silica bulk pressed by the pressing means and wherein the synthetic silica bulk is pressed through the elastic member by the pressing means.

The conventional methods had the problem that bubbles appeared in the synthetic silica bulk during the pressing at high temperatures and many bubbles remained in the silica glass formed product after the forming. For solving this problem, the inventors judged that it was difficult to suppress the occurrence of bubbles itself, because it was mentioned that a temperature slope in the synthetic silica bulk during the pressing at high temperatures contributed to the occurrence of bubbles and because it was difficult to control temperature distribution uniform in the synthetic silica bulk during the pressing at high temperatures. In view of this judgment, the inventors conducted studies on how to quickly dissipate the evolving bubbles to the outside of the synthetic silica bulk and to the outside of the forming vessel, and accomplished the present invention.

Describing in more detail, in the present invention as against the conventional methods, the elastic member with permeability is interposed between the synthetic silica bulk and the forming vessel whereby the bubbles evolving inside the synthetic silica bulk during the forming can be quickly dissipated to the outside of the synthetic silica bulk, and thus the bubbles remaining inside the silica glass formed product after the forming can be reduced to a sufficiently small amount.

In the conventional methods, since the constitutive materials of the synthetic silica bulk and the forming vessel had their respective coefficients of thermal expansion greatly different from each other, there occurred the great difference in shrinkage between the synthetic silica bulk and the forming vessel, which caused the cracking of the silica glass formed body after the pressing or even the breakage of the forming vessel in some cases. In contrast to it, in the present invention, the elastic member with permeability is interposed between the synthetic silica bulk and the forming vessel as described above, whereby the elastic member with permeability functions as a medium for absorbing compressive stress and tensile stress appearing between the synthetic silica bulk and the forming vessel, which can fully suppress the occurrence of stress between the two members during the cooling process after the pressing.

Specifically, when the forming vessel is a graphite forming vessel, the coefficients of linear expansion of silica glass (synthetic silica bulk) and graphite are $5\times10^{-6}$ to $6\times10^{-6}/°C$. and $2\times10^{-4}$ to $6\times10^{-4}/°C$., respectively, and the degree of shrinkage of silica glass is small while that of graphite is large during the cooling process after the pressing at high temperatures. As a consequence, compressive stress acts on the synthetic silica bulk and the tensile stress on the graphite. This facilitated occurrence of breakage of the graphite forming vessel and also caused the cracking of the silica glass formed product due to the compressive stress in the conventional methods. Particularly, in cases wherein the component to vary the refractive index is added, since there is also large difference in viscosity between the synthetic silica bulk and the graphite in addition to that in the coefficient of thermal expansion, it increases the possibility of causing the cracking of the silica glass formed product after the forming and the breakage of the graphite forming vessel more than that with the ordinary synthetic silica bulks. In contrast to it, the present invention can fully suppress the cracking of the silica glass formed product and the breakage of the graphite forming vessel, by interposing the elastic member having the permeability and functioning as a medium for absorbing the compressive stress and tensile stress appearing between the synthetic silica bulk and the forming vessel, between the synthetic silica bulk and the forming vessel.

Further, in the present invention, direct contact between the synthetic silica bulk and the forming vessel is avoided by the elastic member with permeability interposed between the synthetic silica bulk and the forming vessel, and thus it can prevent the reaction between the constitutive materials of the synthetic silica bulk and the forming vessel, which occurred during the pressing in the conventional methods.

In the silica glass forming method of the present invention, the elastic member may be a woven or nonwoven fabric of carbon fiber.

Since the woven or nonwoven fabric of carbon fiber structurally has adequate permeability, interposition of it between the synthetic silica bulk and the forming vessel permits the bubbles evolving inside the synthetic silica bulk during the forming to diffuse in this woven or nonwoven fabric of carbon fiber and be dissipated to the outside more quickly. Therefore, bubbles remaining in the silica glass formed product after the forming can be reduced to a sufficiently small level.

Further, in the silica glass forming method of the present invention, the elastic member may be a woven or nonwoven fabric of ceramic fiber.

Just like the woven or nonwoven fabric of carbon fiber, the woven or nonwoven fabric of ceramic fiber also structurally has adequate permeability. Therefore, bubbles remaining in the silica glass formed product after the forming can be reduced to a sufficiently small level.

In the silica glass forming method of the present invention, it is preferable that the pressing by the pressing means be carried out under a pressure not less than the atmospheric pressure and in an inert gas atmosphere.

When the pressing is carried out in the inert gas atmosphere in this way, the constitutive materials of the synthetic silica bulk and the forming vessel can be prevented more effectively from reacting with each other. For example, where the forming vessel is the graphite forming vessel, the above method can more effectively prevent the trouble that the synthetic silica bulk and the graphite forming vessel react with each other to form silicon carbide.

Further, in the silica glass forming method of the present invention, it is preferable that the pressing by the pressing means be carried out at the temperature of 1750–1850° C. and for 10–60 minutes, preferably 10–30 minutes.

The trouble of the reaction between the constitutive materials of the synthetic silica bulk and the forming vessel can be prevented more effectively by setting the temperature during the forming to 1750–1850° C. and the retention time at that temperature to 10–60 minutes, preferably 10–30 minutes as described. The conventional methods involved the problem that the synthetic silica bulk crystallized in the temperature region of 1400–1600° C., but the crystallization of the synthetic silica bulk can be restrained by setting the temperature during the forming to 1750–1850° C. and the retention time at that temperature to 10–60 minutes, preferably 10–30 minutes as described above. When it becomes feasible to prevent the reaction between the constitutive materials of the synthetic silica bulk and the forming vessel and restrain the crystallization of the synthetic silica bulk, it also becomes feasible to prevent occurrence of the unevenness and cracking in the surface of the silica glass formed product after the forming. Further, execution of the pressing at the temperature and in the range of the retention time as described permits the bubbles evolving inside the synthetic silica bulk to be reduced to a sufficiently small amount.

On the other hand, if the temperature during the pressing is less than 1750° C. there will be a tendency toward more reduction in the yield due to the crystallization of the synthetic silica bulk. If the temperature exceeds 1850° C. there will be a tendency toward creation of more bubbles in the synthetic silica bulk due to evaporation of silica glass. If the pressing time is less than ten minutes the formability will degrade. If it exceeds 30 minutes there will be increasing tendencies to cause the crystallization of the synthetic silica bulk and the creation of bubbles in the synthetic silica bulk.

In the silica glass forming method of the present invention, it is preferable that the synthetic silica bulk have a side face connecting outer edges of the set of opposed surfaces and that an elastic member be placed between this side face and the pressing means. This makes it feasible to dissipate the bubbles appearing in the synthetic silica bulk during the pressing to the outside of the synthetic silica bulk more surely, to prevent the occurrence of compressive stress and tensile stress between the synthetic silica bulk and the forming vessel during the pressing more surely, to prevent the reaction between the constitutive materials of the synthetic silica bulk and the forming vessel during the pressing more surely, and to prevent the breakage of the forming vessel after the pressing more surely.

Further, in the silica glass forming method of the present invention, it is preferable that the synthetic silica bulk have a side face connecting outer edges of the set of opposed surfaces and that a width of the elastic member placed between this side face and the pressing means be not more than a thickness after the forming of the synthetic silica bulk. This permits surer prevention of breakage of the silica glass formed product after the forming and the elastic member.

In the silica glass forming method of the present invention, it is preferable that bulk density of the elastic member be 0.1–0.5 g/cm$^3$.

When the bulk density of the elastic member is 0.1–0.5 g/cm$^3$, the elastic member has better porosity (permeability) and elasticity. Therefore, the bubbles appearing inside the synthetic silica bulk can be eliminated adequately to the outside during the pressing, which can prevent the trouble of the bubbles remaining inside the silica glass formed product after the pressing with more certainty.

However, if the bulk density of the elastic member is less than 0.1 g/cm$^3$, the strength of the elastic member will be inadequate and it will accelerate the tendency to arouse trouble of breakage of the elastic member during the pressing. If the bulk density is over 0.5 g/cm$^3$ on the other hand the elasticity of the elastic member will be too low to sufficiently absorb the compressive stress and tensile stress due to the difference in shrinkage between the synthetic silica bulk and the forming vessel, so as to accelerate the tendency to make trouble of breakage of the synthetic silica bulk or the forming vessel.

Further, in the silica glass forming method of the present invention, it is preferable that a thickness of the elastic member be 1–20 mm.

When the thickness of the elastic member is 1–20 mm, the elastic member has sufficient elasticity and porosity (permeability). Therefore, it can adequately absorb the compressive stress and tensile stress due to the difference in shrinkage between the synthetic silica bulk and the forming vessel during the pressing and adequately eliminate the bubbles appearing inside the synthetic silica bulk to the outside.

However, if the thickness of the elastic member is less than 1 mm the strength of elastic member will be insufficient and it will accelerate the tendency to cause trouble of breakage of the elastic member during the pressing. If the thickness is over 20 mm on the other hand, handling will become poor and the elasticity of the elastic member will be insufficient, which will, in turn, enhance the tendency to give rise to the trouble of the bubbles remaining inside the silica glass formed product after the pressing.

A silica glass forming apparatus of the present invention is a forming apparatus of silica glass comprising a forming vessel for accommodating a synthetic silica bulk having at least a set of opposed surfaces, pressing means for pressing said surfaces of the synthetic silica bulk under a high temperature condition, and a heating device for heating the forming vessel, wherein an elastic member with permeability is placed between the pressing means and said surfaces of the synthetic silica bulk pressed by the pressing means and wherein the synthetic silica bulk is pressed through the elastic member by the pressing means.

Since the silica glass forming apparatus of the present invention comprises the elastic member with permeability placed between the pressing means and the surfaces of the synthetic silica bulk pressed by the pressing means in accordance with the aforementioned silica glass forming method of the present invention as described above, it becomes feasible to more certainly dissipate the bubbles appearing in the synthetic silica bulk during the pressing to the outside of the synthetic silica bulk, to more certainly prevent the compressive stress and tensile stress from appearing between the synthetic silica bulk and the forming vessel during the pressing, and to more certainly prevent the constitutive materials of the synthetic silica bulk and the forming vessel from reacting with each other during the pressing. Therefore, the silica glass forming apparatus of the present invention is able to produce the silica glasses with excellent optical characteristics free of the remaining bubbles and the cracking and, for example, suitable for the optical members such as the reticle substrates, the imaging optical systems, etc. in a high yield.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The silica glass forming method and forming apparatus according to the present invention will be described below in detail with examples thereof.

Figure 1:
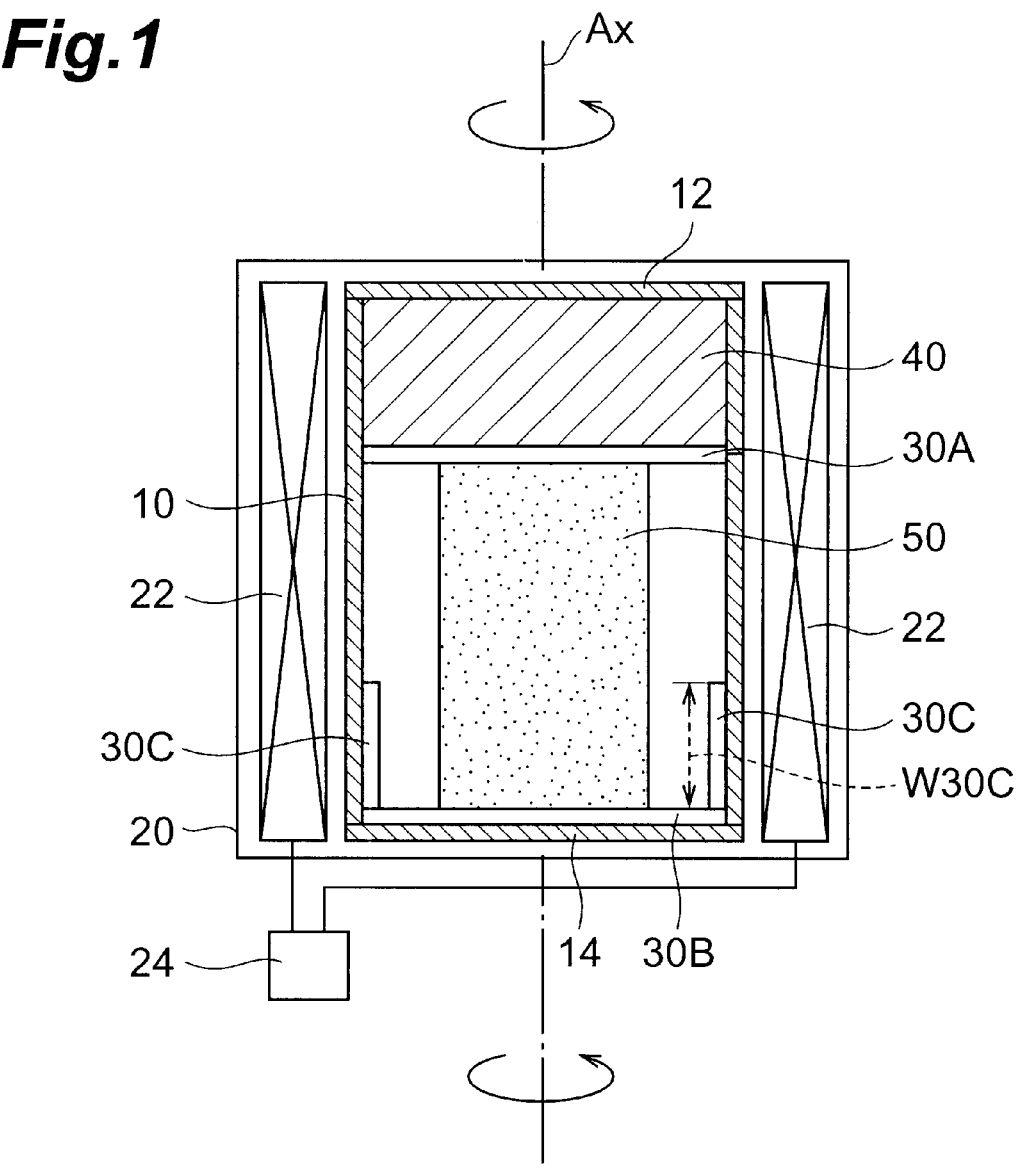
FIG. 1 is a schematic, cross-sectional view to show an example of the silica glass forming apparatus of the present invention.
Figure 2:
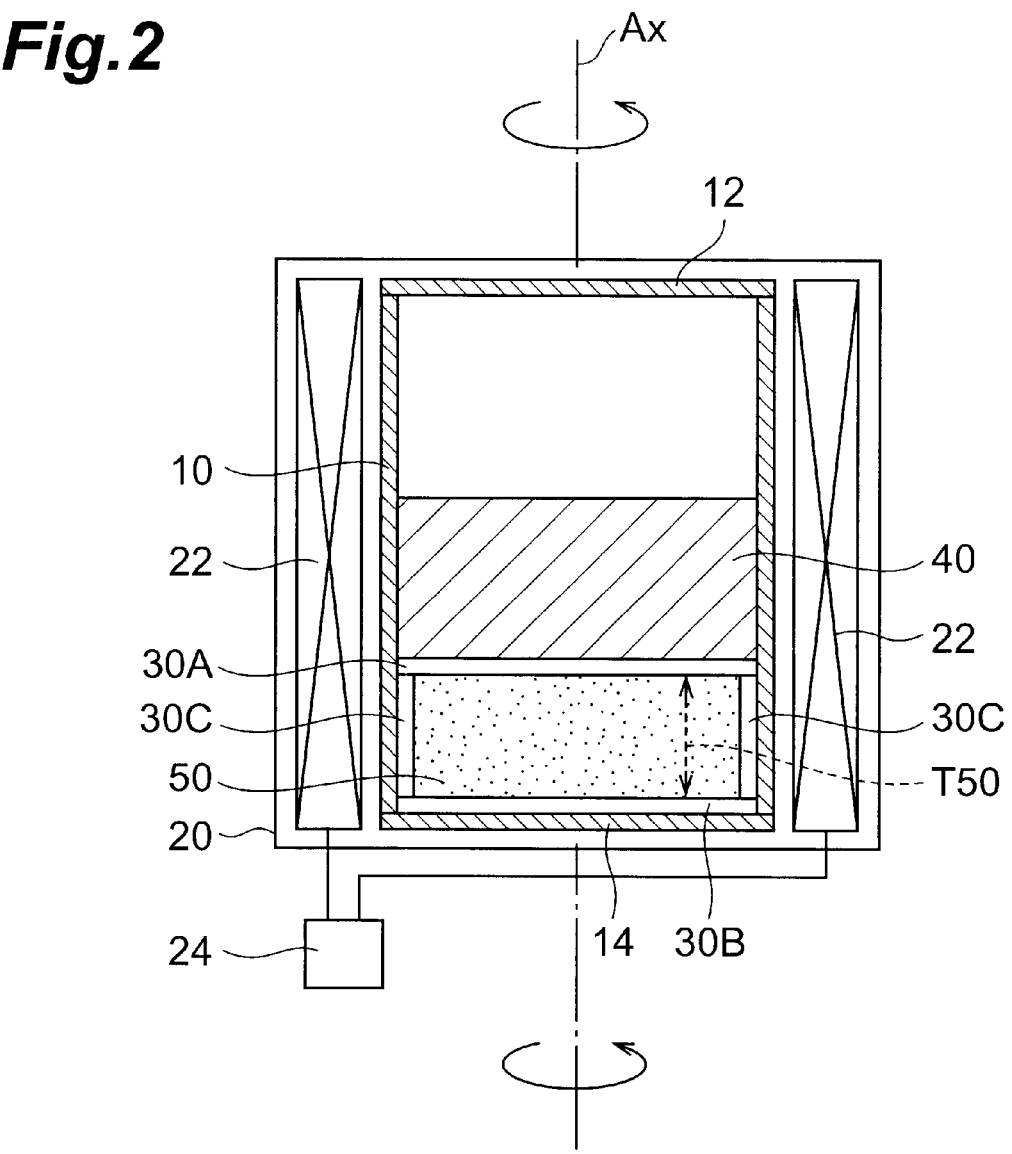
FIG. 2 is a schematic, cross-sectional view to show a pressing state of the synthetic silica bulk by use of the silica glass forming apparatus illustrated in FIG. 1.

FIG. 1 is a schematic, cross-sectional view to show an example of the silica glass forming apparatus of the present invention. FIG. 2 is a schematic, cross-sectional view to show the pressing state of the synthetic silica bulk by use of the silica glass forming apparatus illustrated in FIG. 1.

As illustrated in FIG. 1, the silica glass forming apparatus of the present embodiment is mainly comprised of a graphite forming vessel 10, a weight 40, elastic members with permeability 30A, 30B, and 30C, and an electric furnace 20.

The graphite forming vessel 10 is a cylindrical vessel for accommodating a synthetic silica bulk 50 inside and for forming it by pressing. The shape of the graphite forming vessel 10 is selected according to the shape of the synthetic silica bulk after the pressing (silica glass formed product) 50. For example, the shape may be circular or rectangular.

As illustrated in FIG. 1, a top plate 12 and a bottom plate 14 of graphite are fitted onto the upper surface and onto the lower surface, respectively, of the graphite forming vessel 10. The elastic member 30B with permeability is mounted on the bottom plate 14. The synthetic silica bulk 50 having at least a set of opposed surfaces is mounted with one of the set of opposed surfaces facing down in the center on the elastic member 30B. The elastic member 30A with permeability is mounted on the other surface of the set of opposed surfaces of the synthetic silica bulk 50. The elastic member 30C with permeability is placed in the peripheral part on the elastic member 30B and in contact with the inner side face of the graphite forming vessel 10.

The shape and size of the elastic members 30A and 30B with permeability are properly selected according to the shape of the graphite forming vessel 10. The elastic member 30C with permeability is a continuous ring body having the cross section of ring shape and the ring shape is properly selected according to the cross-sectional shape of the inner side face of the graphite forming vessel 10. The cross-sectional shape of the inner side face of the elastic member 30C is selected according to the shape of the synthetic silica bulk after the pressing (silica glass formed product) 50. Further, as illustrated in FIG. 2, the width of the elastic member 30C (referred to as W30C in FIG. 1) is preliminarily set to not more than the thickness T50 of the synthetic silica bulk after the forming (silica glass formed product) 50.

There are no specific restrictions on the material for the elastic members 30A, 30B, 30C with permeability as long as it has adequate elasticity and porosity (permeability) at high temperatures and functions as a medium capable of adequately absorbing the compressive stress and tensile stress due to the difference in shrinkage between the synthetic silica bulk 50 and the graphite forming vessel 10 during the pressing. Materials preferably applicable are a woven or nonwoven fabric of carbon fiber and a woven or nonwoven fabric of ceramic fiber. Particularly, the woven or nonwoven fabric of carbon fiber is most suitable in terms of heat resistance.

The elastic members with permeability 30A, 30B, 30C have the bulk density in the range of 0.1 to 0.5 g/cm$^3$ and the thickness in the range of 1 to 20 mm. Further, it can also be contemplated that a stack of two or more elastic members are used in order to adjust the thickness.

The weight 40 functions as the pressing means. While the synthetic silica bulk 50 is pressed at high temperatures, the synthetic silica bulk 50 is formed with undergoing thermal deformation because of the total weight of its dead load and the weight 40. The weight 40 is made of a material, for example, selected from carbon graphite, ceramics, and so on.

The electric furnace 20 is intended for use as a heating device, which is comprised of a heater 22 and a temperature control 24 for controlling output of the heater. The electric furnace 20 has such structure that an inert gas under pressure can be introduced into the inside. Further, as illustrated in FIG. 1, the electric furnace 20 is provided with a rotatable mount table (not illustrated), so as to be able to rotate the graphite forming vessel 10 mounted on the mount table with the bottom plate 14 being placed down. In order to achieve the satisfactory effect of the rotation of the mount table on the synthetic silica bulk 50 during the forming, it is desirable herein that a rotation axis AX of the mount table be set so as to pass the center of gravity of the synthetic silica bulk 50 when the graphite forming vessel 10 is mounted on the mount table.

The temperature control 24 functions to keep the temperature in the electric furnace 20 in the desired temperature range during the pressing of the synthetic silica bulk and controls the output of the heater while monitoring the temperature in the electric furnace 20. The temperature control 24 is provided with a function of permitting free setting of a program for controlling the period of pressing in a desired time range as well.

An example of the silica glass forming method according to the present invention will be described below with reference to FIG. 1 and FIG. 2.

First, a silica glass ingot is prepared by the direct process or the VAD process and this is further cut into the synthetic silica bulk 50 having the predetermined size and shape. Then, as illustrated in FIG. 1, the synthetic silica bulk 50 is placed in the graphite forming vessel 10 in which the bottom plate 14 is fitted. On the occasion of placing the synthetic silica bulk 50 in the graphite forming vessel 10, the elastic members with permeability 30A, 30B, 30C are set as illustrated in FIG. 1. After that, the weight 40 is loaded on the elastic member 30A and the top plate 12 is fitted. Then the graphite forming vessel 10 is set in the electric furnace 20 as illustrated in FIG. 1.

Next, the inert gas under pressure is introduced into the electric furnace 20 to replace the air in the electric furnace 20 with the inert gas under pressure. There are no specific restrictions on the inert gas used herein, and the inert gas is properly selected from gases that do not react with the synthetic silica bulk 50, the graphite forming vessel 10, and the elastic members with permeability 30A, 30B, 30C under the temperature condition of the pressing. For example, the inert gas used is selected from $N_2$, Ar, He, and $H_2$. The partial pressure of the inert gas in the electric furnace 20 is preferably 0.05–1.0 MPa. If the partial pressure of the inert gas in the electric furnace 20 is less than 0.05 MPa the silica glass will be likely to evaporate and it will enhance the tendency to cause trouble of bubbles evolving in the synthetic silica bulk. If the partial pressure of the inert gas in the electric furnace 20 is over 1.0 MPa on the other hand, it will strengthen the tendency to cause trouble of breakage of the synthetic silica bulk 50, the graphite forming vessel 10, and so on.

Then the electric furnace 20 is activated to carry out the forming of the synthetic silica bulk 50. The temperature rising, temperature retaining, and temperature decreasing steps in the forming are carried out under the predetermined program preset in the control 24 of the electric furnace 20. The graphite forming vessel 10 is rotated in all the temperature rising, the temperature retaining, and temperature decreasing steps during the forming.

The synthetic silica bulk 50 undergoes thermal deformation because of the total weight of its dead load and the weight 40 in the electric furnace 20 and is formed according to the shape determined by the elastic members 30A, 30B, 30C in the graphite forming vessel 10.

Here the pressure exerted on the synthetic silica bulk 50 during the pressing is preferably 1–20 kg/cm$^2$. If the pressure exerted on the synthetic silica bulk 50 is less than 1 kg/cm$^2$ the adequate pressing will not be complete within a reasonable time in certain cases. If the pressure exerted on the synthetic silica bulk 50 is over 20 kg/cm$^2$ on the other hand, it will strengthen the tendency to cause trouble in terms of residual stress.

The temperature retained during the pressing is 1750–1850° C. and the retention time at that temperature is 10–60 minutes, preferably 10–30 minutes. This can more effectively prevent occurrence of the trouble that the constitutive materials of the synthetic silica bulk 50 and the graphite forming vessel 10 react with each other. It can also restrain the crystallization of the synthetic silica bulk more effectively. In addition, it can prevent occurrence of the unevenness and cracking in the surface of the silica glass formed product after the forming. Further, when the pressing is carried out at the temperature and in the range of the retention time as described above, the bubbles evolving inside the synthetic silica bulk 50 can also be controlled to a sufficiently small amount.

Further, a temperature increasing rate during heating of the synthetic silica bulk 50 up to the retained temperature in the pressing operation is preferably 1–100° C./min. If the temperature increasing rate is less than 1° C./min there will be accelerated tendencies toward the trouble of crystallization of the synthetic silica bulk and toward the trouble that diffusion of impurities is promoted in the synthetic silica bulk. If the temperature increasing rate is over 100° C./min on the other hand, there will be an accelerated tendency toward the trouble of breakage of the synthetic silica bulk 50 and the graphite forming vessel 10.

A temperature decreasing rate during cooling of the synthetic silica bulk (silica glass formed product) 50 from the retained temperature in the pressing to the room temperature after the pressing of the synthetic silica bulk 50 is preferably 1–20° C./min. If this temperature decreasing rate is less than 1° C./min there will be accelerated tendencies toward the trouble of crystallization of the synthetic silica bulk and the trouble that diffusion of impurities is promoted in the synthetic silica bulk. If this temperature decreasing rate is over 20° C./min on the other hand, there will be increasing tendencies toward the trouble of residual stress and toward the trouble that the glass structure becomes instable. If the glass structure were instable, the transmission characteristics of the silica glass formed product after the forming, including the initial transmittance, laser resistance, etc., would degrade.

The bubbles evolving inside the synthetic silica bulk 50 during the pressing are quickly dissipated to the outside of the synthetic silica bulk by the elastic members with permeability 30A to 30C interposed between the synthetic silica bulk 50 and the graphite forming vessel 10. Therefore, the bubbles remaining inside the synthetic silica bulk (silica glass formed product) 50 after the forming are controlled to a sufficiently small amount. Since the elastic members with permeability 30A to 30C function as media for absorbing the compressive stress and tensile stress appearing between the synthetic silica bulk 50 and the graphite forming vessel 10, they adequately restrain the stress from appearing between the two members during the cooling process after the pressing. Therefore, cracking or breakage will not occur in the synthetic silica bulk after the forming (silica glass formed product) 50 and the graphite forming vessel 10.

In the above description the forming vessel was described with the example of the graphite forming vessel, but there are no specific restrictions on the constitutive material of the forming vessel as long as it can endure use under the temperature and pressure conditions of the pressing. The forming vessel can also be made of one of carbon materials and ceramic materials except for graphite.

In the above description the pressing means for forming the synthetic silica bulk at the high temperature was described with the example using the weight, but there are no specific restrictions on the pressing means used in the silica glass forming method and forming apparatus of the present invention. For example, an HIP (hot isobaric press) or a mechanical press may also be used as the pressing means.

The silica glass forming method and forming apparatus of the present invention will be described below in detail with examples. For convenience' sake, the like or equivalent portions to the components illustrated in FIG. 1 will be denoted by the same reference symbols in the following description.

EXAMPLE 1

First, the cylindrical synthetic silica bulk (φ400 mm×t800 mm) 50 containing 1000 ppm OH groups as impurities was produced by the direct process (flame hydrolysis), using a synthesis furnace.

Further prepared on the other hand were the cylindrical graphite forming vessel (the inside of the vessel; diameter 230 mm×height 100 mm) 10 similar to that illustrated in FIG. 1, the graphite top plate 12 (diameter 230 mm×height 10 mm), and the graphite bottom plate 14 (diameter 230 mm×height 10 mm). The elastic members of carbon fiber (Carbon felt, trade name "Carbolon" available from Nippon Carbon Co., Ltd.) 30A, 30B, 30C were placed each in fashion similar to the placement in FIG. 1 inside the graphite forming vessel 10. These carbon fiber elastic members 30A, 30B, 30C (width W30C; 2 to 10 mm) were prepared each in the shape and size matching the size of the inside of the graphite forming vessel 10.

The thicknesses of the carbon fiber elastic members 30B, 30C were 2–3 mm and 10 mm, respectively, and the bulk density of the both members was 0.25 g/cm$^3$. The elastic member 30A was a stack of two sheets each identical to the elastic member 30B. Namely, the thickness of the elastic member 30A was 4–6 mm.

Next, the cylindrical synthetic silica bulk 50 was set in the state similar to FIG. 1 in the graphite forming vessel 10. After that, the weight of graphite (gross weight; 5 kg) 40 was mounted on the carbon fiber elastic member 30A, and the top plate 12 was further fitted to the graphite forming vessel 10. Then the graphite forming vessel 10 accommodating the cylindrical synthetic silica bulk 50 was mounted in the state similar to FIG. 1 on the rotatable mount table in the electric furnace 20.

Next, N$_2$ (5 atm) was introduced as the inert gas into the electric furnace 20 to replace the air in the electric furnace 20 with N$_2$. After that, while rotating the mount table at the rotating speed of 1 rpm in the electric furnace 20, the inside of the electric furnace 20 was heated at the temperature increasing rate of 10° C./min until the temperature reached 1750° C. After the inside of the electric furnace 20 reached 1750° C., the inside was retained at this temperature for 30 minutes and thereafter pressing of the synthetic silica bulk 50 was conducted in the graphite forming vessel 10. After a lapse of 30 minutes, the furnace was cooled at the temperature decreasing rate of 4° C./min down to the room temperature. After the cooling, the cylindrical silica glass formed product (diameter 220 mm×height 30 mm) after the pressing was taken out of the inside of the graphite forming vessel 10.

EXAMPLE 2

The silica glass formed product after the pressing was made in the same manner as in Example 1 except that the retained temperature in the pressing was 1800° C.

EXAMPLE 3

The silica glass formed product after the pressing was made in the same manner as in Example 1 except that the synthetic silica bulk containing 30000 ppm F as impurities was prepared by the VAD process and that the retained temperature in the pressing was 1775° C.

EXAMPLE 4

The silica glass formed product after the pressing was made in the same manner as in Example 1 except that the synthetic silica bulk containing 15000 ppm F as impurities was prepared by the VAD process and that the retained temperature in the pressing was 1800° C.

Reference Example 1

The silica glass formed product after the pressing was made in the same manner as in Example 1 except that the elastic member 30C was not placed on the side face in the graphite forming vessel 10.

Reference Example 2

The silica glass formed product after the pressing was made in the same manner as in Example 1 except that the elastic member 30C was not placed on the side face in the graphite forming vessel 10 and that the retained temperature in the pressing was 1800° C.

Reference Example 3

The silica glass formed product after the pressing was made in the same manner as in Example 1 except that the synthetic silica bulk containing 30000 ppm F as impurities was prepared by the VAD process, that the elastic member 30C was not placed on the side face in the graphite forming vessel 10, and that the retained temperature in the pressing was 1775° C.

Comparative Example 1

The silica glass formed product after the pressing was made in the same manner as in Example 1 except that the elastic member 30A was not placed in the graphite forming vessel 10.

Comparative Example 2

The silica glass formed product after the pressing was made in the same manner as in Example 1 except that the elastic member 30A was not placed in the graphite forming vessel 10 and that the elastic member 30B was not placed on the bottom surface in the graphite forming vessel 10.

Comparative Example 3

The silica glass formed product after the pressing was made in the same manner as in Example 1 except that the synthetic silica bulk containing 30000 ppm F as impurities was prepared by the VAD process, that the elastic member 30A was not placed in the graphite forming vessel 10, and that the retained temperature in the pressing was 1775° C.

Comparative Example 4

The silica glass formed product after the pressing was made in the same manner as in Example 1 except that the synthetic silica bulk containing 30000 ppm F as impurities was prepared by the VAD process, that the elastic member 30A was not placed in the graphite forming vessel 10, that the elastic member 30B was not placed on the bottom surface in the graphite forming vessel 10, and that the retained temperature in the pressing was 1775° C.

Comparative Example 5

The silica glass formed product after the pressing was made in the same manner as in Example 1 except that none of the elastic members was placed in the graphite forming vessel 10.

<Evaluation of Silica Glass Formed Products Obtained After Forming>

Each of the cylindrical silica glass formed products of Examples 1 to 4, Reference Examples 1 to 3, and Comparative Examples 1 to 5 after the pressing was cut in the central part along a plane normal to the center axis of the cylinder. Amounts and distribution states of bubbles remaining inside the respective synthetic silica bulks were compared by observing the cut surfaces thereof and evaluation was made about whether each product was suitable for the optical members. The results of the evaluation are presented in Table 1.

The criteria for the evaluation about whether each product was suitable for the optical members were as follows:

A; no bubbles remain at all and the product can be used as an optical member,

B; bubbles remain only in the vicinity of the surface (in the range of 0 to about 2 mm) of the silica glass formed product and it can be used as an optical member after the surface is polished, C; bubbles remain inside the silica glass formed product (in the range of about 2 to about 5 mm) and it cannot be used as an optical member, D; bubbles remain inside the silica glass formed product (in the range of about 5 to about 10 mm) and it cannot be used as an optical member, E; bubbles remain in a wide range from the central part to the surface of the silica glass formed product, there are also through holes formed from the central part to the surface of the synthetic silica bulk, and it cannot be used as an optical member.

<Condition of Forming Vessel After Forming>

The condition of the forming vessel was also observed after the production of the cylindrical silica glass formed products of Examples 1 to 4, Reference Examples 1 to 3, and Comparative Examples 1 to 5 by the pressing, and they were compared as to presence or absence of cracking or breakage. The results of these are presented in Table 1.

TABLE 1

| | Method of synthesis | Placement of elastic members (refer to FIG. 1) | Impurity conc./ppm | Inert gas (rtnd press/atm) | Rtnd temp/° C. | Rtnd time/min | State of bubbles in $SiO_2$ glass product after processing | Condition of forming vessel after pressing |
|---|---|---|---|---|---|---|---|---|
| Ex 1 | direct process | do. to FIG. 1 | [OH] = 1000 | $N_2$ (5) | 1750 | 30 | A | normal |
| Ex 2 | direct process | do. to FIG. 1 | [OH] = 1000 | $N_2$ (5) | 1800 | 30 | A | normal |
| Ex 3 | VAD PROCESS | do. to FIG. 1 | [F] = 30000 | $N_2$ (5) | 1775 | 30 | B | normal |
| Ex 4 | VAD PROCESS | do. to FIG. 1 | [F] = 15000 | $N_2$ (5) | 1800 | 30 | B | normal |
| Ref 1 | direct process | w/o 30C | [OH] = 1000 | $N_2$ (5) | 1750 | 30 | B | brk of vessel |
| Ref 2 | direct process | w/o 30C | [OH] = 1000 | $N_2$ (5) | 1800 | 30 | B | brk of vessel |
| Ref 3 | VAD PROCESS | w/o 30C | [F] = 30000 | $N_2$ (5) | 1775 | 30 | B | brk of vessel |
| Cmpr 1 | direct process | w/o 30A | [OH] = 1000 | $N_2$ (5) | 1750 | 30 | C | normal |
| Cmpr 2 | direct process | w/o 30A, w/o 30B | [OH] = 1000 | $N_2$ (5) | 1750 | 30 | C | normal |
| Cmpr 3 | VAD PROCESS | w/o 30A | [F] = 30000 | $N_2$ (5) | 1775 | 30 | D | normal |
| Cmpr 4 | VAD PROCESS | w/o 30A, w/o 30B | [F] = 30000 | $N_2$ (5) | 1775 | 30 | E | normal |
| Cmpr 5 | direct process | none | [OH] = 1000 | $N_2$ (5) | 1750 | 30 | E | brk of vessel |

From the results presented in Table 1, it was verified that the bubbles remaining inside the silica glass formed product after the forming were controlled to a sufficiently small amount in the silica glass formed products of Examples 1 to 4 and Reference Examples 1 to 3 formed by the silica glass forming method and forming apparatus of the present invention. It was also verified on the other hand that a lot of bubbles remained throughout the wide range inside the silica glass formed product after the forming in the case of the silica glass formed products of Comparative Examples 1 to 5 formed without the permeable, elastic member(s) on the upper surface and/or on the lower surface of the cylindrical silica glass formed product.

It was thus verified from the above that the silica glass forming method and forming apparatus of the present invention permitted the high-yield production of silica glass products.

Particularly, it was verified that the synthetic silica bulks of Examples 1 to 4 conforming to the most preferred form of the silica glass forming method and forming apparatus of the present invention caused neither cracking nor breakage in the condition of the forming vessel after the forming and that silica glass products were able to be produced with higher productivity by placing the elastic member with permeability on the side face of the synthetic silica bulk (reference should be made to the elastic member 30C of FIG. 1).

Further, it was verified that bubbles remaining inside each silica glass formed product after the forming were controlled to a sufficiently small amount in the case of all the silica glass formed products of Example 3, Example 4, and Reference Example 3 containing the F component of high concentration as impurities. This proved that the silica glass forming method and forming apparatus of the present invention were also effective to the synthetic silica glasses doped with the component to vary the refractive index, being likely to create a number of bubbles during the forming, and having so high viscosity that bubbles were apt to remain inside after the forming.

As described above, the present invention makes it feasible to reduce the amount of bubbles remaining inside the silica glass formed product after the forming to a sufficiently small level. The present invention also makes it feasible to adequately suppress the occurrence of stress between the synthetic silica bulk and graphite during the cooling process after the forming.

Therefore, the invention can provide the method that permits the high-yield production of the silica glass formed products with excellent optical characteristics free of the remaining of bubbles and the cracking and suitable for the optical members, for example, such as the reticle substrates, the imaging optical systems, etc., by pressing the synthetic silica glasses made of the raw materials of silicon tetrachloride, silanes, organic silicons, etc. and the synthetic silica glasses doped with the component to vary the refractive index, such as Ge, Ti, B, F, Al, or the like, and the forming apparatus for carrying out the method.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claims is:

1. A silica glass forming method of pressing a synthetic silica bulk having at least a set of opposed surfaces and a side face connecting outer edges of said set of opposed surfaces within a forming vessel having a size to permit the bulk to be reduced in at least one dimension and be enlarged in another dimension when pressed, said method comprising:

placing an elastic member with permeability between pressing means and said surfaces of said synthetic silica bulk pressed by the pressing means;

pressing said synthetic silica bulk through said elastic member by said pressing means to reduce the thickness of the silica bulk, when pressing at least one side of the set of opposed surfaces of said synthetic silica bulk under a high temperature condition by pressing means; and placing the elastic member between said side face of said synthetic silica bulk and inside surface of said forming vessel opposing to said side face, the elastic member having a width extending between the set of opposed surfaces of not more than a thickness of said synthetic silica bulk after the silica glass is formed.

2. The forming method according to claim 1, wherein said elastic member is a woven or nonwoven fabric of carbon fiber.

3. The forming method according to claim 1, wherein said elastic member is a woven or nonwoven fabric of ceramic fiber.

4. The forming method according to claim 1, wherein the pressing by said pressing means is carried out under a pressure not less than the atmospheric pressure and in an inert gas atmosphere.

5. The forming method according to claim 1, wherein the pressing by said pressing means is carried out at a temperature of 1750–1850° C. and for 10–60 minutes.

6. The forming method according to claim 1, wherein bulk density of said elastic member is 0.1–0.5 g/cm$^3$.

7. The forming method according to claim 1, wherein a thickness of said elastic member is 1–20 mm.

8. A silica glass forming apparatus comprising:

a forming vessel for accommodating a synthetic silica bulk having at least a set of opposed surfaces and a side face connecting outer edges of said set of opposed surfaces and having a size to permit the bulk to be reduced in at least one dimension and be enlarged in another dimension when pressed;

pressing means for pressing at least one side of the set of opposed surfaces of said synthetic silica bulk under a high temperature condition to reduce the thickness of the silica bulk;

a heating device for heating said forming vessel, and an elastic member with permeability being placed between said pressing means and said surfaces of said synthetic silica bulk pressed by the pressing means; and the elastic member is placed between said side face of said synthetic silica bulk and inside surface of said forming vessel opposing to said side face, the elastic member having a width extending between the set of opposed surfaces of not more than a thickness of said synthetic silica bulk after the silica glass is formed.

* * * * *